Dec. 23, 1947.  M. V. GROVES  2,433,213
AIR BLEEDING MEANS FOR MASTER CYLINDERS
Filed May 2, 1946
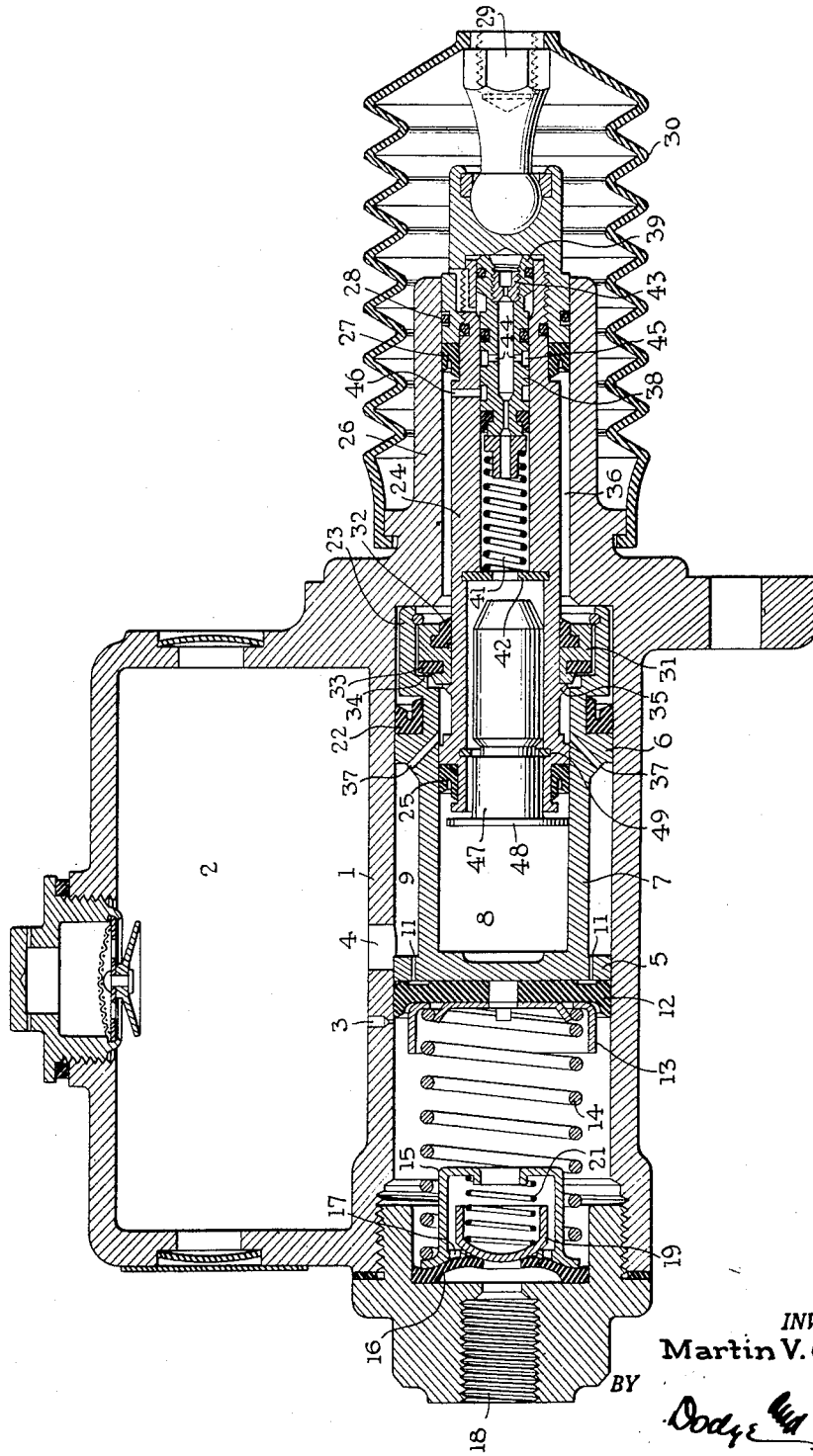
INVENTOR.
Martin V. Groves
BY
Dodge & Im.

Patented Dec. 23, 1947

2,433,213

UNITED STATES PATENT OFFICE 2,433,213

AIR BLEEDING MEANS FOR MASTER CYLINDERS

Martin Valentine Groves, Brooklyn, N. Y., assignor to The New York Air Brake Company, a corporation of New Jersey Application May 2, 1946, Serial No. 666,606

3 Claims. (Cl. 60—54.6)

This invention relates to pulsators used to operate hydraulic brakes and similar devices, and is directed to means for causing the hydraulic liquid to entrain and carry to a point of separation any bubbles of gas which may be present in the pulsator.

This function is comparatively readily carried out with a simple master cylinder by the usual compensating port and bleed valves, but with the compound or two-stage type of master cylinder the secondary cylinder must be freed of air by other means.

The invention was developed for use with, and will be described as applied to a commercial embodiment of the pulsator shown in Figs. 1–5 of my Patent No. 2,343,900, issued March 14, 1944.

In the device of the prior patent a primary piston works in the usual master cylinder to displace oil into the brake lines, and to permit it to return under the urge of the releasing springs incorporated in each braking unit. Formed in the primary piston is a secondary cylinder, and in this cylinder is reciprocable a secondary piston upon which the brake pedal reacts.

A staging valve responsive to pressure in the secondary cylinder prevents outflow from the secondary cylinder until a definite pressure has been developed in the secondary cylinder. This occurs after the running slack has been taken up and development of braking pressure in the master cylinder has commenced. Until it occurs, the two pistons move together as a unit.

When the staging valve shifts it allows hydraulic fluid to be displaced from the secondary cylinder into a working space behind the master piston, so that the device functions as a hydraulic intensifier to increase the pressure developed in the brake lines relatively to the force applied to the pedal.

Thus, the second stage of operation entails outflow of oil from the secondary cylinder, and the purpose of the invention is to provide means to ensure entrainment by this oil of any gas (usually air) which may be present in the secondary cylinder. The presence of air causes an impositive action, called "spongy pedal" by service mechanics. The presence of air is seldom encountered except when the device is first put into service.

With the device of the invention incorporated in the pulsator, a few applications made on a car in motion will remove substantially all air. Thereafter, the device serves as a stand-by effective to remove any gas that may enter. As a practical matter, the entry of gas in the normal use of the device is next to impossible.

The invention will now be described in detail by reference to the accompanying drawing in which the single figure is a vertical axial section of a compound master cylinder of commercial form with the invention incorporated and the parts in brake-releasing position. Statements of direction hereinafter made refer to the device positioned as shown in the drawing.

The master cylinder 1 is mounted at the bottom of the reservoir 2 and ports 3 and 4 lead from the reservoir to the interior of the cylinder and are located so that the small port 3 is just forward of the primary piston when the latter is in its retracted (brake releasing) position.

The primary piston comprises two heads 5 and 6 connected by a sleeve-like portion 7 of smaller diameter which encloses the secondary cylinder 8 and defines an annular flow space 9 with which the port 4 always communicates. Since reservoir 2 is filled with hydraulic brake liquid, the space 9 is always similarly filled.

A series of ports 11 lead through head 5 from space 9 and are controlled by a combined cup packing and check valve 12, which is seated against the face of piston head 5 by a cup-like spring-seat 13 against which the piston-return spring 14 reacts. The other end of spring 14 reacts against the housing 15 of a double check valve, described and claimed in my copending application, Serial No. 643,332, filed January 25, 1946.

So far as is here material, this check valve is constructed as follows: An annular rubber member 16, upon the margin of which the housing 15 seats, has a free inner margin which functions as a check valve to control ports 17 so as to permit unidirectional free flow from the primary cylinder to the connection 18. This connection communicates with the brake cylinders. A reversely seated cup-like check valve 19 is loaded by spring 21 to control a central port in housing 14 and offer resistance to back flow from connection 18.

The head 6 supports a rubber gasket 22, U-shaped in cross section and arranged to seal the head 6 against flow forward (to the left in the drawing). Behind this gasket the primary piston carries a cup-like extension 23.

A secondary plunger 24 counterbored from its inner end works in the secondary cylinder 8 in the primary piston, and carries at its inner end a gasket 25 U-shaped in cross section and arranged to seal against leakage from the cylinder.

The outer end of plunger 24 is guided in the tubular extension 26 of cylinder 1, and is there provided with sealing gaskets 27, 28. The plunger 24 may be forced inward by thrust connection 29 which is intended to be connected to the usual brake pedal. A bellows boot 30 protects the parts.

Encircling the plunger 24 and slidable thereon is a ring valve 31, having a gasket 32 which seals the valve to the plunger, and a seating gasket 33 adapted to produce a seal with valve seat 34. A shoulder 35 on plunger 24 holds the valve 31 unseated, when plunger 24 is fully retracted. When the valve 31 is closed it closes communication from space 36, behind (i. e. to the right of) the primary piston to ports 37 drilled through head 6 of the primary piston. These ports 37 lead to space 9, which, as has been stated, always is in communication with reservoir 2 through port 4.

The staging valve 38 has an enlarged piston head 39 which works in a small cylinder formed in the outer end of plunger 24. The staging valve is biased to the right by a coil compression spring 41 which reacts between the valve 38 and an annular spring seat 42. An axial passage leads through valve 38 from cylinder 8 to the working space to the right of piston head 39 so that rising pressure in cylinder 8 is effective to urge the valve 38 to the left against the resistance offered by spring 41.

A restriction 43 formed in an interchangeable plug is used to delay the shift of valve 38 upon rise of pressure in cylinder 8. In advance of restriction 43 ports 44 lead from the axial bore of valve 38 and communicate with an encircling groove 45. This groove is so located that when valve 38 has moved to the left to its limit of motion, groove 45 registers with ports 46 in plunger 24.

The structure so far described will be recognized as essentially similar to that disclosed in Patent No. 2,343,900, except that there is no coil compression spring reacting between plunger 24 (the secondary piston) and the head 5 of the primary piston. Such a spring may be dispensed with because retreat of the primary piston will displace liquid into cylinder 8 and force plunger 24 back. Consequently, spring 14 is made sufficiently heavy to assure the retreat of the primary and secondary pistons.

According to the invention, the cylindrical counterbore in the end of plunger 24 is nearly, but not completely, filled by a generally cylindrical plug 47 which has a disc-like head 48 only slightly smaller than the bore of cylinder 8. The plug is loose in the bore so that it may rock and is retained in the bore by a groove-engaging snap-ring 49.

When plunger 24 is forced to the left the staging valve 38 is closed so that no liquid can escape from cylinder 8. Consequently, the primary piston must move with the plunger. Displacement of liquid from the primary cylinder actuates the brake motors, takes up the running slack and starts a brake application.

Eventually sufficient pressure will be developed in cylinder 8 to shift valve 38. This permits outflow from cylinder 8, so plunger 24 starts to telescope into the primary piston. The initial motion permits valve 31 to close, whereupon the pressure developed in cylinder 8 becomes effective on the right-hand end of the primary piston to force that piston to the left. Since plunger 24 is smaller in diameter than the primary piston hydraulic intensification of the force reaction is had.

The action of the device is attended by outflow of liquid from cylinder 8. If, on assembly, cylinder 8 is only partly liquid filled, the vehicle in which the master cylinder is used is driven and a number of applications and releases are made. The plug 47 rocks and frees air bubbles so that they float to the top. Also, the plug limits the flow path to a thin crescent-shaped cross section, and the head 48 performs a similar function.

In consequence, air bubbles are entrained in the outflowing liquid and discharged through ports 44 and 46. In release position the air escapes past valve 31 to port 37 and thence to the reservoir 2.

The scheme has been found very effective to discharge air from cylinder 8, and can readily be adopted without substantial changes in design.

What is claimed is:

1. Means for clearing a pulsator cylinder of gas bubbles trapped in hydraulic liquid present in the cylinder, comprising in combination with said cylinder, means forming a large diameter generally cylindrical and approximately horizontal passage through which hydraulic liquid flows to and from the cylinder in the normal functioning of the pulsator, at least the top of said passage being near the highest part of the cylinder; means forming a gas separation space to which said passage leads; a cylindrical filler piece sufficiently smaller than said passage to rock freely therein, but large enough to limit the flow path to a relatively slender cross section; and means for retaining said filler piece in said passage, while permitting it to rock.

2. Means for clearing a generally horizontal pulsator cylinder of gas bubbles trapped in hydraulic liquid present in the pulsator, comprising in combination with the cylinder, a pulsator plunger reciprocable in the cylinder bore, and having an axial passage through which outflow of liquid occurs as an incident to operation of the pulsator, said passage being materially larger than necessary for the passage of such liquid and only moderately smaller than the cylinder bore; a cylindrical filler piece nearly filling said passage for substantially the entire length thereof; and means for retaining said filler piece against substantial motion in an axial direction, while permitting it to rock.

3. The combination defined in claim 2 in which the filler piece projects beyond the face of the plunger and carries a flange spaced from and overlying the plunger face.

MARTIN VALENTINE GROVES.

REFERENCES CITED

The following references are of record in the file of this patent:

UNITED STATES PATENTS

| Number | Name | Date |
|---|---|---|
| 2,407,957 | Hull-Ryde | Sept. 17, 1946 |